US012786976B2

(12) United States Patent
He et al.

(10) Patent No.: US 12,786,976 B2
(45) Date of Patent: Nov. 3, 2026

(54) RESOURCE DETERMINATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Chuanfeng He, Dongguan (CN); Weijie Xu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 333 days.

(21) Appl. No.: 18/335,967

(22) Filed: Jun. 15, 2023

(65) Prior Publication Data

US 2023/0328707 A1 Oct. 12, 2023

Related U.S. Application Data

(63) Continuation of application No. PCT/CN2020/137721, filed on Dec. 18, 2020.

(51) Int. Cl.

| | |
|---|---|
| ***H04W 72/0457*** | (2023.01) |
| ***H04W 72/51*** | (2023.01) |
| ***H04W 74/0833*** | (2024.01) |
| ***H04W 74/0836*** | (2024.01) |

(52) U.S. Cl.

CPC ....... *H04W 72/0457* (2023.01); *H04W 72/51* (2023.01); *H04W 74/0833* (2013.01); *H04W 74/0836* (2024.01)

(58) Field of Classification Search

None

See application file for complete search history.

(56) References Cited

U.S. PATENT DOCUMENTS

| | | | | |
|---|---|---|---|---|
| 2015/0358131 | A1* | 12/2015 | Siomina | H04J 11/0056 370/252 |
| 2019/0150213 | A1* | 5/2019 | Kim | H04L 41/08 370/254 |
| 2019/0312713 | A1* | 10/2019 | Yang | H04W 72/23 |
| 2020/0053811 | A1* | 2/2020 | Ang | H04L 5/0098 |
| 2020/0344030 | A1* | 10/2020 | Cheng | H04W 76/30 |
| 2020/0383103 | A1* | 12/2020 | Zhou | H04L 5/0064 |

(Continued)

FOREIGN PATENT DOCUMENTS

| | | |
|---|---|---|
| CN | 108633059 | 10/2018 |
| CN | 109644432 | 4/2019 |

(Continued)

OTHER PUBLICATIONS

EPO, Communication for EP Application No. 20965651.1, Mar. 18, 2025.

(Continued)

*Primary Examiner* — Phirin Sam

(74) *Attorney, Agent, or Firm* — Hodgson Russ LLP

(57) ABSTRACT

Provided are a resource determination method, a terminal device, and a network device. The method includes the following: the terminal device determines, according to a bandwidth capability supported by the terminal device and bandwidth information obtained from system information, a frequency domain resource for transmission of first information in a random access procedure.

18 Claims, 7 Drawing Sheets

200

(56) References Cited

U.S. PATENT DOCUMENTS

| | | | | |
|---|---|---|---|---|
| 2021/0014010 A1* | 1/2021 | Babaei | H04W 72/0446 | |
| 2021/0028912 A1* | 1/2021 | Xu | H04L 5/0098 | |
| 2021/0051707 A1* | 2/2021 | Rastegardoost | H04W 74/006 | |
| 2021/0329574 A1* | 10/2021 | Ang | H04L 5/0037 | |
| 2022/0104109 A1* | 3/2022 | Lei | H04W 48/14 | |
| 2022/0201716 A1* | 6/2022 | Yi | H04W 24/08 | |
| 2022/0210806 A1* | 6/2022 | Rastegardoost | H04L 5/0094 | |
| 2023/0133904 A1* | 5/2023 | Turtinen | H04W 74/0833 | 370/329 |
| 2023/0180199 A1* | 6/2023 | Jung | H04L 1/0038 | 370/329 |

FOREIGN PATENT DOCUMENTS

| | | |
|---|---|---|
| CN | 109803396 | 5/2019 |
| CN | 110831126 | 2/2020 |
| CN | 111567126 | 8/2020 |
| EP | 4093139 | 11/2022 |
| EP | 4106428 | 12/2022 |
| EP | 4135457 | 2/2023 |
| EP | 4192164 | 6/2023 |
| WO | 2019096202 | 5/2019 |
| WO | 2021010786 | 1/2021 |
| WO | 2021146871 | 7/2021 |
| WO | 2021161485 | 8/2021 |

OTHER PUBLICATIONS

"3rd Generation Partnership Project; Technical Specification Group Radio Access Network; NR; Multiplexing and channel coding (Release 16)," 3GPP TS 38.212, Jun. 2020, v16.2.0.

"3rd Generation Partnership Project; Technical Specification Group Radio Access Network; NR; Physical layer procedures for control (Release 16)," 3GPP TS 38.213, Jun. 2020, v16.2.0.

Qualcomm Incorporated, "Channel Bandwidth Signalling," 3GPP TSG-RAN WG2 Meeting #103, R2-1811132, Aug. 2018.

WIPO, International Search Report and Written Opinion for International Application No. PCT/CN2020/137721, Sep. 8, 2021.

EPO, Extended European Search Report for EP Application No. 20965651.1, Dec. 8, 2023.

EPO, Communication for EP Application No. 20965651.1, Aug. 29, 2024.

ZTE, "Potential UE complexity reduction features," 3GPP TSG RAN WG1 #103-e, R1-2007715, Oct. 2020.

EPO, Communication for EP Application No. 20965651.1, Oct. 17, 2025.

EPO, Communication for EP Application No. 20965651.1, Apr. 30, 2026.

* cited by examiner

RESOURCE DETERMINATION METHOD, TERMINAL DEVICE, AND NETWORK DEVICE

CROSS-REFERENCE TO RELATED APPLICATION(S)

This application is a continuation of International Application No. PCT/CN2020/137721, filed Dec. 18, 2020, the entire disclosure of which is incorporated herein by reference.

TECHNICAL FIELD

This disclosure relates to the field of communication, and in particular to a resource determination method, a terminal device, and a network device.

BACKGROUND

In some communication scenarios, a terminal with reduced capability (RedCap terminal) is introduced, which is used for a scenario in which performance requirements such as latency, reliability, bandwidth, coverage and throughput are relatively low. With regard to such RedCap terminals, how to determine frequency domain resources for transmitting information in a random access procedure is a problem to be solved urgently.

SUMMARY

In a first aspect, provided is a resource determination method. The method includes the following: a terminal device determines, according to a bandwidth capability supported by the terminal device and bandwidth information obtained from system information, a frequency domain resource for transmission of first information in a random access procedure.

In a second aspect, provided is a resource determination method. The method includes the following: a network device determines, according to a bandwidth capability supported by a terminal device and bandwidth information carried in system information, a frequency domain resource for transmission of first information in a random access procedure.

In a third aspect, provided is a terminal device. The terminal device includes a processor and a memory, where the memory is configured to store computer programs, and the processor is configured to invoke and run the computer programs stored in the memory to execute the method in the first aspect.

In a fourth aspect, provided is a network device. The network device includes a processor and a memory, where the memory is configured to store computer programs, and the processor is configured to invoke and run the computer programs stored in the memory to execute the method in the second aspect.

DETAILED DESCRIPTION

Figure 1:
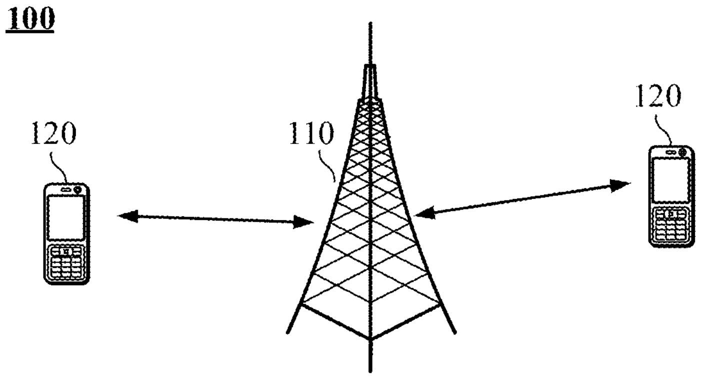
FIG. 1 is a schematic diagram of a communication system architecture to which implementations of the disclosure applied.

The following will describe technical solutions of implementations of the disclosure with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Technical solutions of implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a 5th generation (5G) communication system, or other communication systems, etc.

A conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

Optionally, the communication system in implementations of the disclosure is applicable to an unlicensed spectrum, and an unlicensed spectrum may be regarded as a shared spectrum. Or the communication system in implementations of the disclosure is applicable to a licensed spectrum, and a licensed spectrum may be regarded as a non-shared spectrum.

Various implementations of the disclosure are described in connection with a network device and a terminal device. The terminal device may also be referred to as a user equipment (UE), an access terminal, a user unit, a user station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In implementations of the disclosure, the terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.).

In implementations of the disclosure, the terminal device can be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device (g-Node B (gNB)) in an NR network, or a network device in a future evolved PLMN, etc.

By way of explanation rather than limitation, in implementations of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Exemplarily, FIG. 1 illustrates a communication system 100 to which implementations of the disclosure are applied. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area.

FIG. 1 exemplarily illustrates one network device and two terminal devices. Optionally, the communication system 100 may also include multiple network devices, and there can be other quantities of terminal devices in a coverage area of each of the network devices. Implementations of the disclosure are not limited in this regard.

Optionally, the communication system 100 may further include other network entities such as a network controller, a mobile management entity, or the like, and implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

Terms used in the implementations of the disclosure are only used to explain specific embodiments of the disclosure, rather than intended to limit the disclosure. The terms "first", "second", "third", and "fourth" etc. in the description and claims of this disclosure and in the drawings, are used for distinguishing between different objects and not for describing a particular order. Furthermore, the terms "including" and "having" and any variations thereof, are intended to cover a non-exclusive inclusion.

It should be understood that, "indication" referred to in implementations of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of implementations of the disclosure, the term "correspondence" may mean that there is a direct or indirect correspondence between the two, may mean that there is an association between the two, or may mean a relationship of indicating and indicated or configuring and configured, etc.

"Predefined" may be implemented by pre-saved corresponding codes, tables, or other modes that can indicate relevant information in a device (for example, a terminal device and a network device). Specific implementation manners of the present application are not limited. For example, "predefined" may refer to "defined" in a protocol.

In implementations of the disclosure, the "protocol" may refer to a standard protocol in the field of communications, for example, may include an LTE protocol, an NR protocol, and a related protocol applied to a future communication system, which is not limited in the present application.

For better understanding of implementations of the disclosure, relevant random access procedures will be detailed below.

Figure 2:
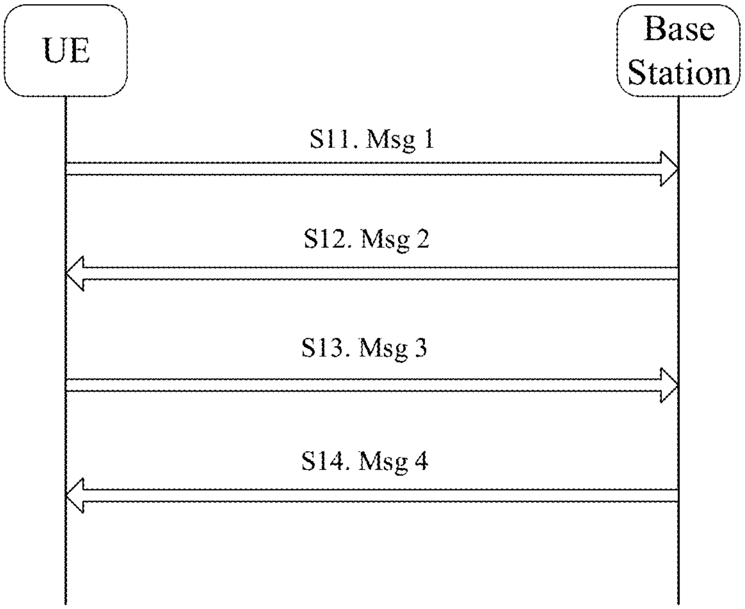
FIG. 2 is a schematic flowchart of a four-step random access procedure provided in implementations of the disclosure.

In 5G system, the random access procedure adopts a four-step random access procedure similar to LTE, as illustrated in FIG. 2.

S11, UE transmits a physical random access channel (PRACH) to a base station, where the PRACH includes a random access preamble, that is, Message 1 (Msg1).

S12, the base station transmits a random access response (RAR) to the UE upon detection of the random access preamble transmitted by the UE, that is, Message 2 (Msg2), to inform the UE the physical uplink shared channel (PUSCH) resource that can be used by the UE when transmitting Message 3 (Msg3), allocates a radio network temporary identity (RNTI) for the UE, and provides a timing advance command to the UE.

S13, the UE transmits Msg3 on the PUSCH resource indicated by the RAR after receiving the RAR, where the Msg3 carries a UE specific temporary identity.

S14, the base station transmits Message 4 (Msg4) to the UE and allocates uplink transmission resources for the UE, where the Msg4 includes a contention resolution message. Upon reception of Msg4 from the base station, the UE will check whether the UE specific temporary identity carried in Msg3 is contained in the contention resolution message transmitted by the base station. If the UE specific temporary identity is contained in the contention resolution message, the random access is deemed as successful, otherwise, the random access is deemed as failed and the UE needs to initiate the random access procedure again from the first step.

The latency overhead of the four-step random access procedure is relatively large, which is not suitable for the scenario of low latency and high reliability in 5G. In the NR standardization process, considering the characteristics of low-latency and ultra-reliable related services, a two-step random access procedure, i.e. a type 2 (Type-2) random access procedure, is introduced in Release16 (R16), and compared with the four-step random access procedure, the access latency can be reduced. Correspondingly, the four-step random access procedure is referred to as type 1 (Type-1) random access procedure.

Figure 3:
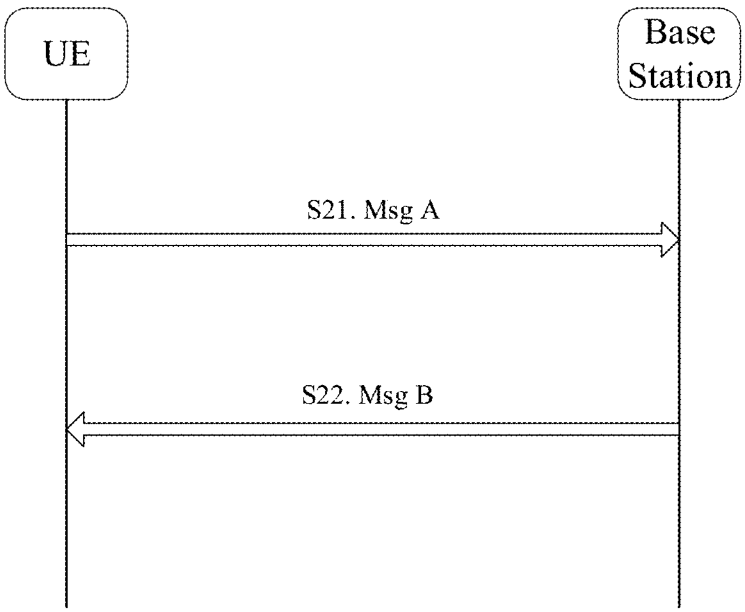
FIG. 3 is a schematic flowchart of a two-step random access procedure provided in implementations of the disclosure.

The two-step random access procedure is illustrated in FIG. 3. Somewhat simplified, the two-step random access procedure combines Msg1 and Msg3 in the four-step random access procedure into single S21 in the two-step random access procedure, where the UE transmits message A (MsgA), and combines Msg2 and Msg4 in the four-step random access procedure into single S22 in the two-step random access procedure, where the base station transmits message B (MsgB) as a response. For S21 in the two-step random access procedure, MsgA includes the preamble and the PUSCH, MsgB includes a physical downlink control channel (PDCCH) and a physical downlink shared channel (PDSCH). For MsgA, UE needs to transmit the preamble and the PUSCH, where the random access channel occasion (RACH occasion, RO) for the preamble is the same as the four-step random access procedure. The RO can be shared between the two-step random access procedure and the four-step random access procedure through network configuration, or the RO for the two-step random access procedure can be configured separately. A time-frequency resource where the PUSCH is located is referred to as a PUSCH occasion (PO). One PO may include multiple PUSCH resource units (PRU), one PRU include a PUSCH resource and a demodulation reference signal (DMRS), and the DMRS includes a DMRS port and a DMRS sequence. PO is configured by the network either, and the period of PO is identical to and associated with the period of RO.

For better understanding of implementations of the disclosure, a terminal with a reduced capability (RedCap terminal) will be described below.

The NR system is mainly designed to support an enhanced mobile broadband (eMBB) service, and a main technology thereof is to meet requirements of a high-speed rate, a high-frequency spectrum efficiency, and a large bandwidth. In fact, in addition to the eMBB, there are various service types, such as sensor network, video monitoring, wearable, etc., which have requirements different from the eMBB service in terms of rate, bandwidth, power consumption, cost, etc. The capability of a terminal supporting these services is reduced compared with that of a terminal supporting the eMBB, for example, the supported bandwidth is reduced, the processing time is relaxed, the number of antennas is reduced, and the maximum modulation order is relaxed. The NR system needs to be optimized for these services and corresponding low-capability terminals, and such terminals may be referred to as RedCap terminals for short. In the LTE technology, similar systems have been designed to support terminals with a large number of connections, low power consumption, and low cost, such as machine type communication (MTC), and narrow band Internet of Things (NB-IoT). In the NR system, it is desirable to introduce a similar technology for better supporting other service types except the eMBB service using the NR technology. For such low-complexity and low-cost terminals, one optimization required is coverage enhancement, which is used to improve downlink and uplink coverage of such terminals.

For better understanding of implementations of the disclosure, recognizing of RedCap terminals by a network is described below.

For an initially accessed UE, after receiving system information, the UE initiates a random access procedure to establish a radio resource control (RRC) connection with the network. In this procedure, the network needs to recognize the type of the UE and obtain capability information related to the UE.

Currently, the type of the UE can be indicated in the following methods.

The type of the UE is indicated during transmission of Msg1, for example, indicated through an initial uplink bandwidth part (BWP) where Msg1 is transmitted, through a separate PRACH resource, or by dividing a separate PRACH preamble set.

The type of the UE is indicated during transmission of Msg3, for example, in the load of a Msg3 PUSCH carried.

The type of the UE is indicated after Msg4 is transmitted, for example, indicated through message 5 (Msg5) or reported as the capability of the UE.

For the two-step random access procedure, the type of the UE is indicated during transmission of MsgA.

For better understanding of implementations of the disclosure, described below is frequency points of 5G.

The frequency point of 5G is divided into two parts: FR1 (f<6 GHz, low frequency) and FR2 (f>6 GHz, high frequency, millimeter wave). For FR1, the bandwidth supported by the UE may be 5 MHz, 10 MHz, 15 MHz, 20 MHz, 25 MHz, 30 MHz, 40 MHz, 50 MHz, 60 MHz, 80 MHz, and 100 MHz. For FR2, the bandwidth supported by the UE may be 50 MHz, 100 MHz, 200 MHz, 400 MHz, etc. In order to enable the UE to support accessing a network over a 5G frequency band, for FR1, the bandwidth needs to be supported by the UE is 100 MHz. Correspondingly, for the frequency band of the FR2, the bandwidth needs to be supported by the UE is 400 MHz.

For RedCap terminals, one of the major features thereof is the reduced bandwidth supported, thereby reducing power consumption and cost. An existing NR system does not specially consider supporting a terminal with a low bandwidth capability to access a network, which causes that such terminals cannot access the network because the supported bandwidth is relatively small.

In an initial access process, the UE needs to obtain, from master information block (MIB) information carried by a physical broadcast channel (PBCH), information about a control resource set (CORESET) #0 and a search space #0 of a type 0 PDCCH, for indicating a resource block (RB) in a frequency domain and a symbol in the time domain of the type 0 PDCCH. The CORESET #0 information indicates an index, and according to the index, the number of RBs and the number of symbols of the CORESET #0, and an RB offset relative to a synchronization signal block (SSB) are obtained. For FR1, in the case of a subcarrier spacing of 15 kHz, the bandwidth of the CORESET #0 may be configured as 24, 48, 96 RBs, corresponding to the bandwidths of 5 MHz, 10 MHz, 20 MHz. In the case of a subcarrier spacing of 30 kHz, the maximum number of RBs configured for the CORESET #0 is 48 and therefore does not exceed a bandwidth of 20 MHz. The UE receives scheduling information of a PDSCH carrying a system information block (SIB) through the type 0 PDCCH, thereby receiving the SIB1 information. For FR1, the RedCap terminal can support a bandwidth of 20 MHz in the initial access stage, which is greater than or equal to the bandwidth of the CORESET #0, and therefore can successfully receive the type 0 PDCCH. By the same reasoning, for FR2, the RedCap terminal can support a bandwidth of 100 MHz in the initial access stage, which is also greater than or equal to the bandwidth of the CORESET #0.

The UE may receive, through a type0 PDCCH, scheduling information of a PDSCH carrying an SIB, so as to receive SIB1 information. From the SIB1 information, the UE may obtain initial downlink BWP configuration information and initial uplink BWP configuration information. Channel transmission and channel reception in a random access procedure of the UE may be performed on the initial downlink BWP and the initial uplink BWP. In the related art, the bandwidth configured for the initial downlink BWP and the initial uplink BWP is allowed to exceed the bandwidth of the CORESENT #0. If the cell supports the access of the RedCap terminal and uses the existing configurations of the initial downlink BWP and initial uplink BWP, the bandwidth configuration thereof may exceed the bandwidth capability of the RedCap terminal, causing that the RedCap terminal cannot correctly receive and transmit the channel (information in the random access procedure) in the initial access stage.

Based on the above technical problem, a resource determination method is provided. In this method, a frequency domain resource for information transmission in a random access procedure can be determined according to a bandwidth capability supported by a terminal device and bandwidth information obtained from system information, which can ensure that the frequency domain resource for information transmission in the random access procedure is within a bandwidth capability range supported by the terminal device, so that information in the random access procedure can be correctly transmitted or received to complete the random access procedure.

Technical solutions of the disclosure are detailed below with implementations.

Figure 4:
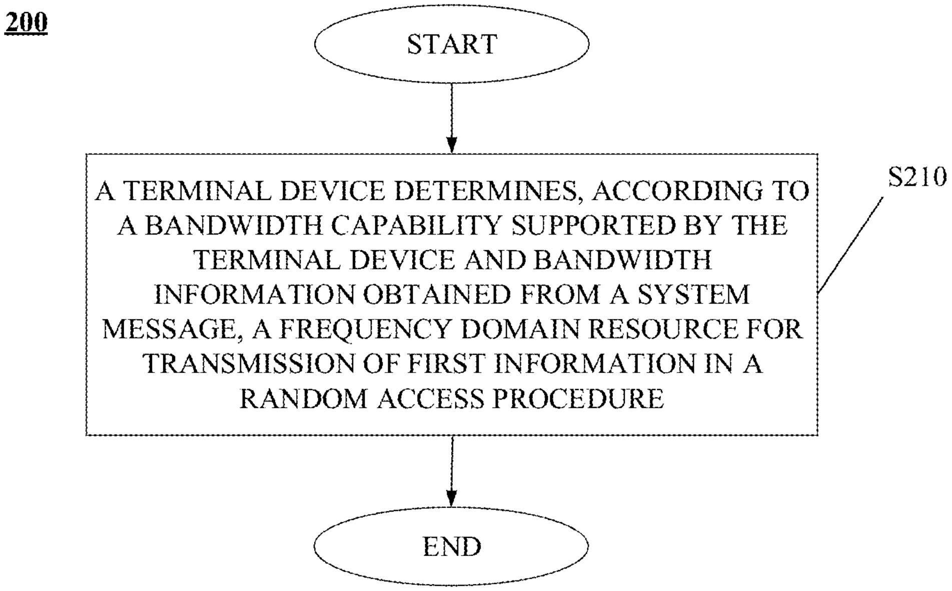
FIG. 4 is a schematic flowchart of a resource determination method provided in implementations of the disclosure.

FIG. 4 is a schematic diagram of a resource determination method 200 according to implementations of the disclosure. As illustrated in FIG. 4, the method 200 may include at least part of the following contents.

S210, the terminal device determines a frequency domain resource for transmission of first information in a random access procedure, according to a bandwidth capability supported by the terminal device and bandwidth information obtained from system information.

In implementations of the disclosure, the terminal device can determine, according to the bandwidth capability supported by the terminal device and the bandwidth information obtained from the system information, the frequency domain resource for transmission of the first information in the random access procedure, so as to ensure that the frequency domain resource for transmission of the first information in the random access procedure is within the bandwidth capability range supported by the terminal device, so that the terminal device can correctly send or receive the first information in the random access procedure, and complete the random access procedure.

Optionally, the terminal device is a terminal with reduced capability (Redcap terminal). The terminal device can also be terminal devices with a specific bandwidth capability, which is not limited herein.

Optionally, the system information can be SIB1 information. The system information can also be other information, which is not limited herein.

Optionally, in some implementations, the bandwidth information includes at least one of: a control resource set 0 (CORESET #0), an initial downlink BWP, an initial uplink BWP.

Optionally, as Example 1, the bandwidth information includes the CORESET #0 and/or the initial downlink BWP. In this case, the first information is downlink information in the random access procedure.

Optionally, in Example 1, the first information includes at least one of: the $2^{nd}$ message in a four-step random access procedure (Msg2), the 4th message in the four-step random access procedure (Msg4), or the $2^{nd}$ message in a two-step random access procedure (MsgB).

It should be noted that, in the four-step random access procedure, after transmitting Msg1, the terminal device obtains scheduling information for PDSCH carrying RAR by detecting DCI format 1_0 with cyclical redundancy check (CRC) scrambled by a random access radio network temporary identity (RA-RNTI). In the two-step random access procedure, after transmitting MsgA, the terminal device obtains scheduling information for PDSCH carrying MsgB by detecting DCI format 1_0 with CRC scrambled by a MsgB-RNTI. The scheduling information for PDSCH contains frequency-domain resource indication information. The frequency domain resource is indicated within a bandwidth range of the CORESET #0 configured. If the CORESET #0 is not configured, the frequency domain resource is indicated within a bandwidth range of an initial downlink BWP configured.

For the Redcap terminal, if the CORESET #0 or initial downlink BWP configured by the network device is used, the bandwidth configuration of the initial downlink BWP or the CORESET #0 may exceed the bandwidth capability supported by the Redcap terminal. Therefore, the frequency domain range indicated in the initial downlink BWP or the CORESET #0 by the frequency-domain resource indication information should be restricted.

Optionally, in some implementations of Example 1, the S210 may be as follows.

When the bandwidth of the CORESET #0 is greater than the bandwidth capability supported by the terminal device, the terminal device determines the frequency domain range for transmission of the first information as a first bandwidth in the bandwidth of the CORESET #0, and the first bandwidth is less than or equal to the bandwidth capability supported by the terminal device.

In this case, the terminal device determines the frequency-domain bandwidth range corresponding to the frequency-domain resource indication information as the first bandwidth determined above. Specifically, the frequency-domain resource indication information is as follows.

The number of bits:

$$\lceil \log_2(N_{RB}^{DL,BWP}(N_{RB}^{DL,BWP}+1)/2) \rceil,$$

where $$N_{RB}^{DL,BWP}$$

is no longer the bandwidth of the CORESET #0 configured, for the RedCap terminal, $$N_{RB}^{DL,BWP}$$

is partial bandwidth defined in the bandwidth of the CORESET #0 configured, that is, the first bandwidth.

Figure 5:
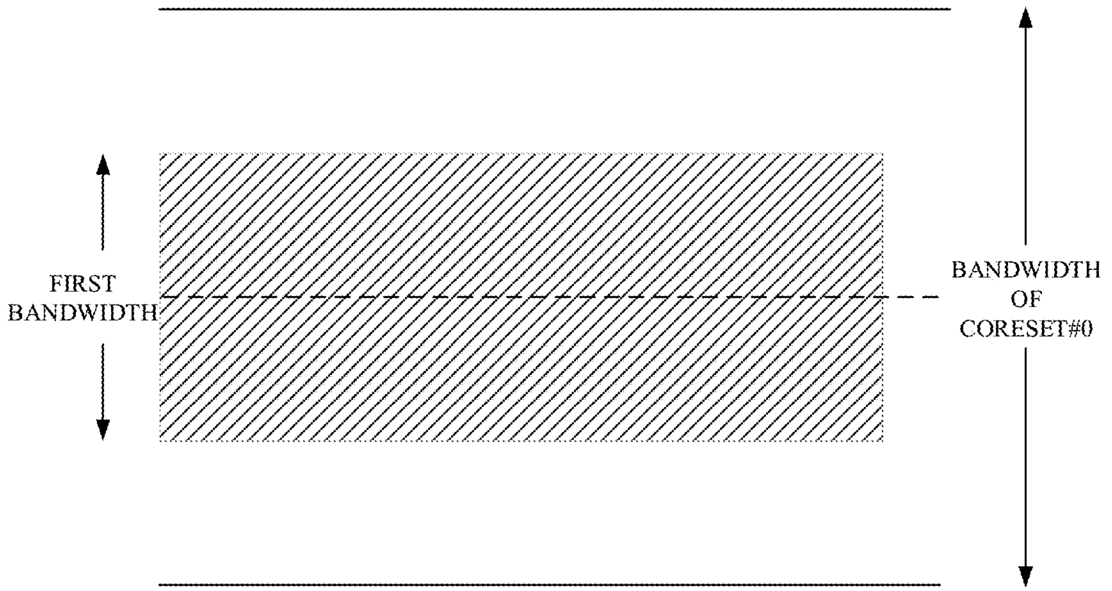
FIG. 5 is a schematic diagram of a first bandwidth and a control resource set 0 (CORESET #0) provided in implementations of the disclosure.
Figure 6:
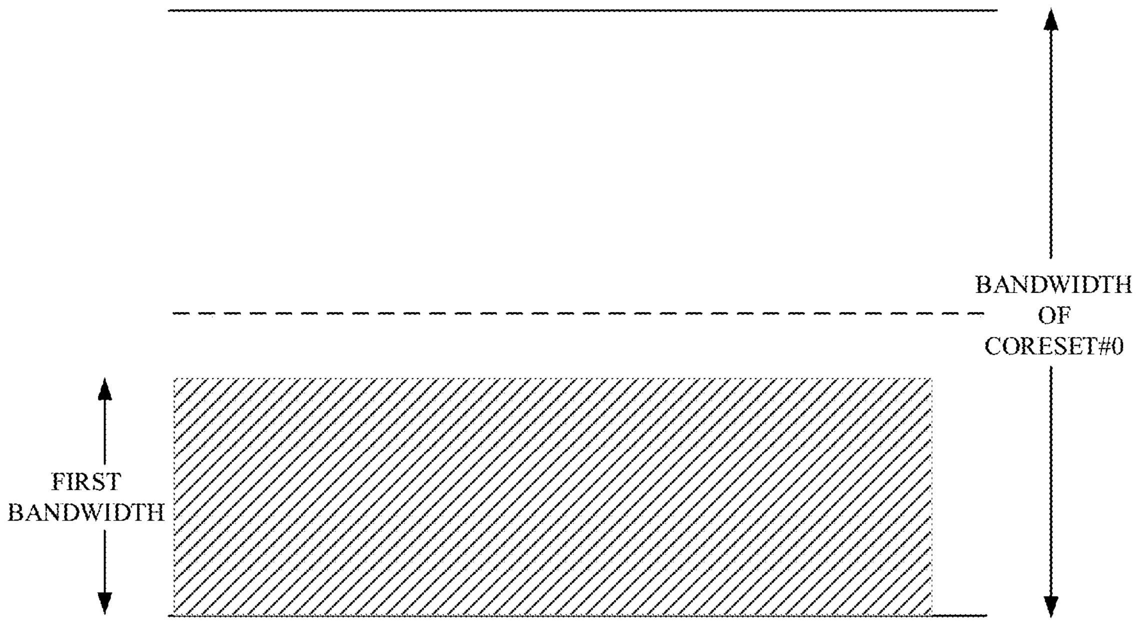
FIG. 6 is another schematic diagram of a first bandwidth and CORESET #0 provided in implementations of the disclosure.

Optionally, the first bandwidth is a center bandwidth of the CORESET #0, for example, as illustrated in FIG. 5, the first bandwidth is at the center of the bandwidth of the CORESET #0 and is equal to half of the bandwidth of the CORESET #0. Alternatively, the first bandwidth is an edge bandwidth of the CORESET #0, for example, as illustrated in FIG. 6, the first bandwidth is at an edge of the bandwidth of the CORESET #0 and is less than half of the bandwidth of the CORESET #0.

It should be noted that, at the center, the center frequency of the first bandwidth is the same of the center frequency of the bandwidth of the CORESET #0. The edge may refer to a consecutive bandwidth of the first bandwidth that starts from the first RB in the bandwidth of the CORESET #0.

Optionally, the first bandwidth is predefined in a protocol or preconfigured, or, the first bandwidth is configured or indicated by a network device, or, the first bandwidth is obtained from the system information (such as SIB1 information).

Optionally, in some implementations of Example 1, the S210 may be as follows.

When a bandwidth of the initial downlink BWP is greater than the bandwidth capability supported by the terminal device, the terminal device determines the frequency domain range for transmission of the first information as a second bandwidth in the bandwidth of the initial downlink BWP, and the second bandwidth is less than or equal to the bandwidth capability supported by the terminal device.

In this case, the terminal device determines the frequency-domain bandwidth range corresponding to the frequency-domain resource indication information as the second bandwidth determined above. Specifically, the frequency-domain resource indication information is as follows.

The number of bits:

$$\lceil \log_2(N_{RB}^{DL,BWP}(N_{RB}^{DL,BWP}+1)/2) \rceil,$$

where $$N_{RB}^{DL,BWP}$$

is no longer the bandwidth of the initial downlink BWP configured, for the RedCap terminal, $$N_{RB}^{DL,BWP}$$

is partial bandwidth defined in the bandwidth of the initial downlink BWP configured, that is, the second bandwidth.

Figure 7:
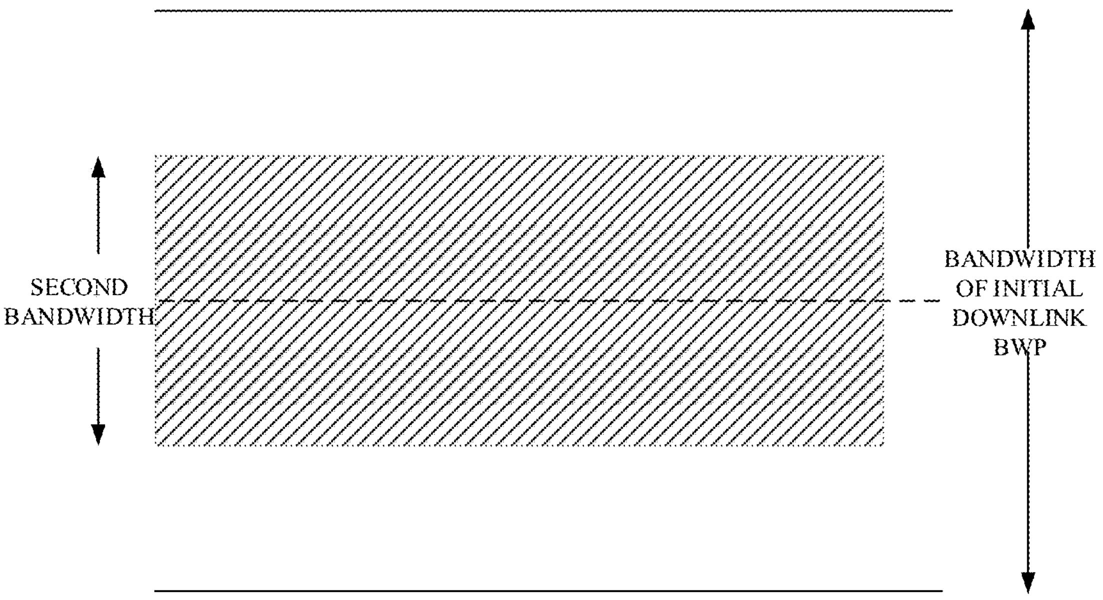
FIG. 7 is a schematic diagram of a second bandwidth and an initial downlink bandwidth part (BWP) provided in implementations of the disclosure.
Figure 8:
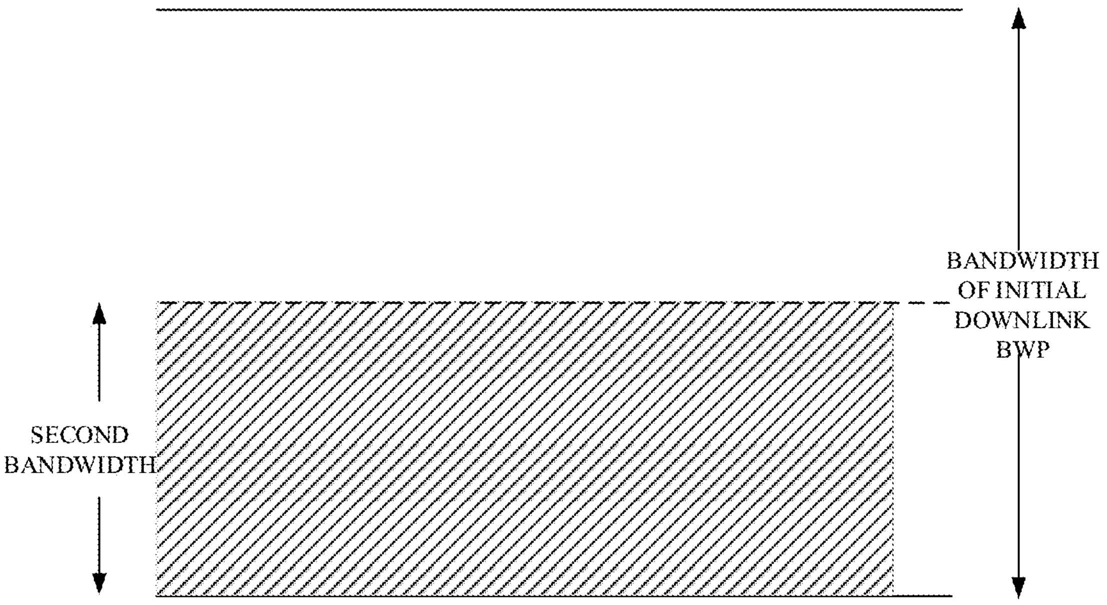
FIG. 8 is another schematic diagram of a second bandwidth and an initial downlink BWP provided in implementations of the disclosure.

Optionally, the second bandwidth is a center bandwidth of the initial downlink BWP, for example, as illustrated in FIG. 7, the second bandwidth is at the center of the bandwidth of the initial downlink BWP and is equal to half of the bandwidth of the initial downlink BWP. Alternatively, the second bandwidth is an edge bandwidth of the initial downlink BWP, for example, as illustrated in FIG. 8, the second bandwidth is at an edge of the bandwidth of the initial downlink BWP and is equal to half of the bandwidth of the initial downlink BWP.

It should be noted that, at the center, the center frequency of the second bandwidth is the same of the center frequency of the bandwidth of the initial downlink BWP. The edge may refer to a consecutive bandwidth of the second bandwidth that starts from the first RB in the bandwidth of the initial downlink BWP.

Optionally, the second bandwidth is predefined in a protocol or preconfigured, or, the second bandwidth is configured or indicated by the network device, or, the second bandwidth is obtained from the system information (such as SIB1 information).

Optionally, in some implementations of Example 1, the S210 may be as follows.

When the bandwidth of the CORESET #0 is less than or equal to the bandwidth capability supported by the terminal device, the terminal device determines the frequency domain range for transmission of the first information as the bandwidth of the CORESET #0; or when the bandwidth of the initial downlink BWP is less than or equal to the bandwidth capability supported by the terminal device, the terminal device determines the frequency domain range for transmission of the first information as the bandwidth of the initial downlink BWP.

Optionally, as Example 2, the bandwidth information includes the initial uplink BWP, and in this case, the first information is uplink information in the random access procedure.

Optionally, in Example 2, the first information includes the third message in the four-step random access procedure (Msg3).

It should be noted that, in the four-step random access procedure, after transmitting Msg1, the RedCap terminal detects DCI format 1_0 with CRC scrambled by RA-RNTI, so as to receive RAR. RAR indicates the scheduling information for PUSCH carrying Msg3. Similarly, the scheduling information for PUSCH contains frequency-domain resource indication information. The frequency domain resource is indicated in the bandwidth range of the initial uplink BWP configured. When Msg3 is retransmitted, the scheduling information for the PUSCH is indicated by DCI format 0_0 with CRC scrambled by a temporary cell RNTI (TC-RNTI).

For the Redcap terminal, if the bandwidth range of the initial uplink BWP is used, the bandwidth configuration of the initial uplink BWP may exceed the bandwidth capability supported by the terminal. Therefore, the frequency domain range indicated in the initial uplink BWP by the frequency-domain resource indication information should be restricted.

Optionally, in some implementations of Example 2, the S210 may be as follows.

When the bandwidth of the initial uplink BWP is greater than the bandwidth capability supported by the terminal device, the terminal device determines the frequency domain range for transmission of the first information as a third bandwidth in the bandwidth of the initial uplink BWP, and the third bandwidth is less than or equal to the bandwidth capability supported by the terminal device.

In this case, the terminal device determines the frequency domain bandwidth range corresponding to the frequency-domain resource indication information as the third bandwidth determined above. Specifically, the frequency-domain resource indication information is as follows.

The number of bits:

$$\lceil \log_2(N_{RB}^{DL,BWP}(N_{RB}^{DL,BWP}+1)/2) \rceil,$$

where $$N_{RB}^{DL,BWP}$$

is no longer the bandwidth of the initial uplink BWP configured, for the RedCap terminal, $$N_{RB}^{DL,BWP}$$

is partial bandwidth defined in the bandwidth of the initial uplink BWP configured, that is, the third bandwidth.

Optionally, in some implementations of Example 2, the S210 may be as follows.

When the bandwidth of the initial uplink BWP is greater than the bandwidth capability supported by the terminal device, the terminal device determines the frequency domain range for transmission of the first information according to an activated uplink BWP and a third bandwidth in the bandwidth of the initial uplink BWP, where the third bandwidth is less than or equal to the bandwidth capability supported by the terminal device.

Optionally, in some implementations of Example 2, the S210 may be as follows.

When the activated uplink BWP and the third bandwidth have the same subcarrier spacing configuration and the same cyclic prefix (CP) length and the activated uplink BWP includes all resource blocks (RBs) in the third bandwidth, or when the bandwidth of the activated uplink BWP is the same as the third bandwidth, the terminal device determines the frequency domain range for transmission of the first information as the third bandwidth.

Alternatively, when the activated uplink BWP and the third bandwidth have different subcarrier spacing configurations and different CP lengths, the terminal device determines the frequency domain range for transmission of the first information as W RBs that start from the $1^{st}$ RB in the activated uplink BWP, where W is a positive integer and W is equal to the number of RBs in the third bandwidth.

It should be noted that, when the terminal device is in a connected state and configured with an uplink BWP, in the random access procedure, in the frequency-domain resource indication information for Msg3, the range for frequency-domain resource allocation for Msg3 should be determined according to the currently activated uplink BWP and the initial uplink BWP. However, the bandwidth supported by the RedCap terminal in the connected state may be different from when the terminal is in an initial access, or the bandwidth of the activated uplink BWP may be less than the bandwidth of the initial uplink BWP due to the restriction of the bandwidth capability of the RedCap terminal. Therefore, the RedCap terminal can determine the frequency domain range for transmission of the first information based on the relationship between the activated uplink BWP and the third bandwidth.

Figure 9:
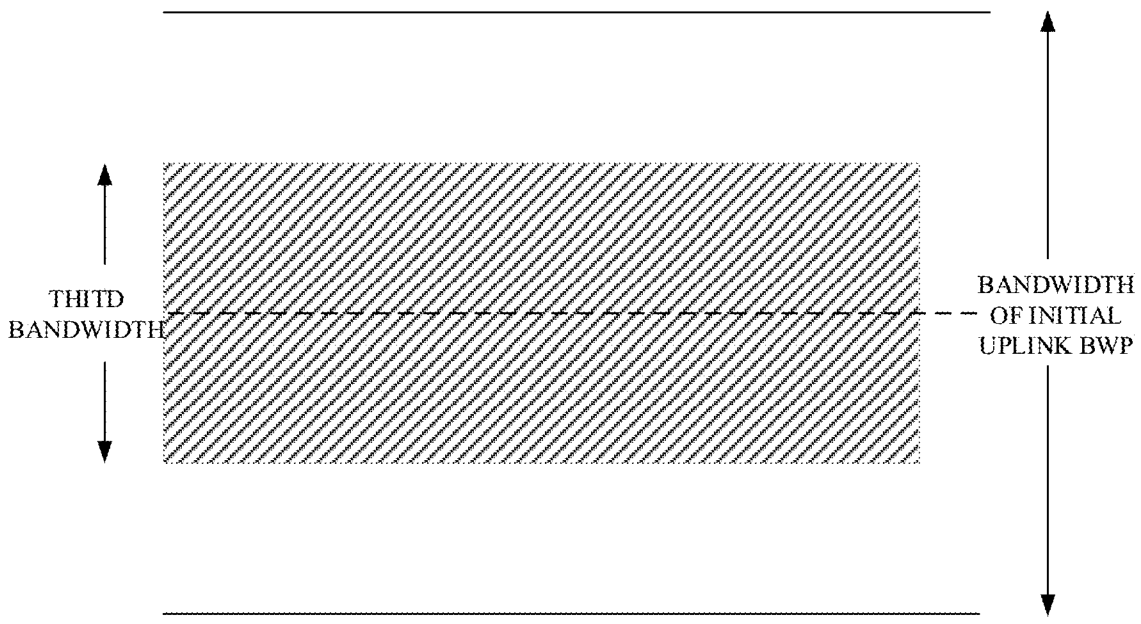
FIG. 9 is schematic diagram of a third bandwidth and an initial uplink BWP provided in implementations of the disclosure.
Figure 10:
FIG. 10 is another schematic diagram of a third bandwidth and an initial uplink BWP provided in implementations of the disclosure.

Optionally, in Example 2, the third bandwidth is a center bandwidth of the initial uplink BWP, for example, as illustrated in FIG. 9, the third bandwidth is at the center of the bandwidth of the initial uplink BWP and is equal to half of the bandwidth of the initial uplink BWP. Alternatively, the third bandwidth is an edge bandwidth of the initial uplink BWP, for example, as illustrated in FIG. 10, the third bandwidth is at an edge of the bandwidth of the initial uplink BWP and is equal to half of the bandwidth of the initial uplink BWP.

It should be noted that, at the center, the center frequency of the third bandwidth is the same of the center frequency of the bandwidth of the initial uplink BWP. The edge may refer to a consecutive bandwidth of the third bandwidth that starts from the $1^{st}$ RB in the bandwidth of the initial uplink BWP.

It should be noted that, for uplink transmission, the terminal device may adopt a discrete Fourier transform spread orthogonal frequency division multiplexing (DFT-S-OFDM) waveform for transmission, and the allocated frequency domain resources are expected to be consecutive. If the frequency domain resource for transmission of Msg3 of the RedCap terminal is the center bandwidth of the initial uplink BWP configured, when transmission of Msg3 of the RedCap terminal and transmission of Msg3 of a non-RedCap terminal are in the same slot, the bandwidth at two sides of the bandwidth of the initial uplink BWP cannot be well utilized by transmission of Msg3 of the non-RedCap terminal. Therefore, the frequency domain resource for transmission of Msg3 of the RedCap terminal is preferably at the edge of the bandwidth of the initial uplink BWP configured.

Optionally, in Example 2, the third bandwidth is preconfigured or defined in a protocol. Alternatively, the third bandwidth is configured or indicated by the network device, or, the third bandwidth is obtained from the system information.

It should be noted that, in the above Example 1 and Example 2, it is assumed that the initial uplink BWP and the initial downlink BWP are shared between the RedCap terminal and the non-RedCap terminal.

Optionally, in some implementations, if the initial uplink BWP and the initial downlink BWP are configured for the RedCap terminal separately, appropriate bandwidth of the initial uplink BWP and appropriate bandwidth of the initial downlink BWP can be configured according to the bandwidth capability of the RedCap terminal. Therefore, the RedCap terminal can determine the frequency domain resource for transmission of uplink information in the random access procedure according to the separately configured initial uplink BWP, alternatively, the RedCap terminal can determine the frequency domain resource for transmission of downlink information in the random access procedure according to the separately configured initial downlink BWP. The initial uplink BWP and the initial downlink BWP thus configured are each RedCap terminal specific, used by the RedCap terminal separately, and are not shared between the RedCap terminal and the non-RedCap terminal.

Therefore, in implementations of the disclosure, the terminal device can determine, according to the bandwidth capability supported by the terminal device and the bandwidth information obtained from the system information, the frequency domain resource for transmission of the first information in the random access procedure, so as to ensure that the frequency domain resource for transmission of the first information in the random access procedure is within the bandwidth capability range supported by the terminal device, so that the terminal device can correctly send or receive the first information in the random access procedure, and complete the random access procedure.

The implementations of the terminal side in the disclosure are described in detail in the foregoing with reference to FIG. 4 to FIG. 10, and the implementations of the network side in the disclosure are described in detail in the following with reference to FIG. 11. It should be understood that the implementations of the network side correspond to the implementations of the terminal side, and reference may be made to the implementations of the terminal side for similar description.

Figure 11:
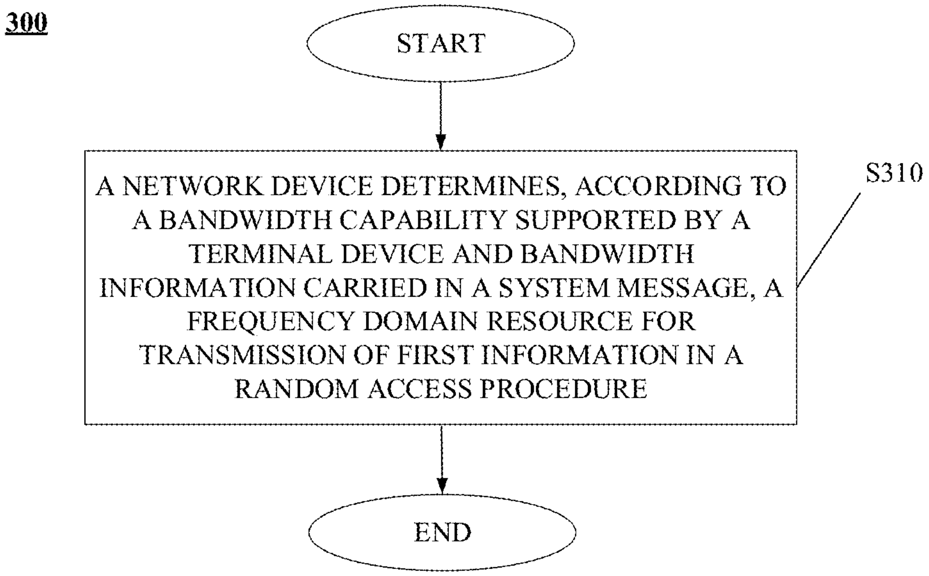
FIG. 11 is schematic flowchart of another resource determination method provided in implementations of the disclosure.

FIG. 11 is a schematic flowchart of a resource determination method 300 according to implementations of the disclosure. As illustrated in FIG. 11, the method 300 may include at least part of the following contents.

S310, a network device determines, according to a bandwidth capability supported by a terminal device and bandwidth information carried in system information, a frequency domain resource for transmission of first information in a random access procedure.

In implementations of the disclosure, the network device can determine, according to the bandwidth capability supported by the terminal device and the bandwidth information carried in the system information, the frequency domain resource for transmission of the first information in the random access procedure, so as to ensure that the frequency domain resource for transmission of the first information in the random access procedure is within the bandwidth capability range supported by the terminal device, so that the network device can correctly send or receive the first information in the random access procedure, and complete the random access procedure.

Optionally, the terminal device is a terminal with reduced capability (Redcap terminal). The terminal device can also be terminal devices with a specific bandwidth capability, which is not limited herein.

Optionally, the system information can be SIB1 information. The system information can also be other information, which is not limited herein.

Optionally, in some implementations, the bandwidth information includes at least one of: a control resource set 0 (CORESET #0), an initial downlink BWP, an initial uplink BWP.

Optionally, as Example 3, the bandwidth information includes the CORESET #0 and/or the initial downlink BWP. In this case, the first information is downlink information in the random access procedure.

Optionally, in Example 3, the first information includes at least one of: the $2^{nd}$ message in a four-step random access procedure (Msg2), the 4th message in the four-step random access procedure (Msg4), or the $2^{nd}$ message in a two-step random access procedure (MsgB).

Optionally, in some implementations of Example 3, the S310 may be as follows.

When a bandwidth of the CORESET #0 is greater than the bandwidth capability supported by the terminal device, the network device determines the frequency domain range for transmission of the first information as a first bandwidth in the bandwidth of the CORESET #0, and the first bandwidth is less than or equal to the bandwidth capability supported by the terminal device.

Optionally, the first bandwidth is a center bandwidth of the CORESET #0, or the first bandwidth is an edge bandwidth of the CORESET #0.

Optionally, the first bandwidth is predefined in a protocol or preconfigured, or, the first bandwidth is configured or indicated by the network device, or, the first bandwidth is information carried in the system information (for example, SIB 1 information).

Optionally, in some implementations of Example 3, the S310 may be as follows.

When a bandwidth of the initial downlink BWP is greater than the bandwidth capability supported by the terminal device, the network device determines the frequency domain range for transmission of the first information as a second bandwidth in the bandwidth of the initial downlink BWP, and the second bandwidth is less than or equal to the bandwidth capability supported by the terminal device.

Optionally, the second bandwidth is a center bandwidth of the initial downlink BWP, or the second bandwidth is an edge bandwidth of the initial downlink BWP.

Optionally, the second bandwidth is predefined in a protocol or preconfigured, or, the second bandwidth is configured or indicated by the network device, or, the second bandwidth is information carried in the system information (for example, SIB 1 information).

Optionally, in some implementations of Example 3, the S310 may be as follows.

When a bandwidth of the CORESET #0 is less than or equal to the bandwidth capability supported by the terminal device, the network device determines the frequency domain range for transmission of the first information as the bandwidth of the CORESET #0. Alternatively, when a bandwidth of the initial downlink BWP is less than or equal to the bandwidth capability supported by the terminal device, the network device determines the frequency domain range for transmission of the first information as the bandwidth of the initial downlink BWP.

Optionally, as Example 4, the bandwidth information includes the initial uplink BWP. In this case, the first information is uplink information in the random access procedure.

Optionally, in Example 4, the first information includes the third message in a four-step random access procedure (Msg3).

Optionally, in some implementations of Example 4, the S310 may be as follows.

When a bandwidth of the initial uplink BWP is greater than the bandwidth capability supported by the terminal device, the network device determines the frequency domain range for transmission of the first information as a third bandwidth in the bandwidth of the initial uplink BWP, and the third bandwidth is less than or equal to the bandwidth capability supported by the terminal device.

Optionally, in some implementations of Example 4, the S310 may be as follows.

When the bandwidth of the initial uplink BWP is greater than the bandwidth capability supported by the terminal device, the network device determines the frequency domain range for transmission of the first information according to an activated uplink BWP and a third bandwidth in the bandwidth of the initial uplink BWP, where the third bandwidth is less than or equal to the bandwidth capability supported by the terminal device.

Optionally, in some implementations of Example 4, the S310 may be as follows.

When the activated uplink BWP and the third bandwidth have a same subcarrier spacing configuration and a same CP length and the activated uplink BWP includes all RBs in the third bandwidth, or when a bandwidth of the activated uplink BWP is the same as the third bandwidth, the network device determines the frequency domain range for transmission of the first information as the third bandwidth. Alternatively, when the activated uplink BWP and the third bandwidth have different subcarrier spacing configurations or different CP lengths, the network device determines the frequency domain range for transmission of the first information as W RBs that start from the 1st RB in the activated uplink BWP, where W is a positive integer and W is equal to the number of RBs in the third bandwidth.

Optionally, the third bandwidth is a center bandwidth of the initial uplink BWP, or the third bandwidth is an edge bandwidth of the initial uplink BWP.

Optionally, the third bandwidth is predefined in a protocol or preconfigured, or, the third bandwidth is configured or indicated by the network device, or, the third bandwidth is carried in the system information (SIB1 information).

It should be noted that, in the above Example 3 and Example 4, it is assumed that the initial uplink BWP and the initial downlink BWP are shared between the RedCap terminal and the non-RedCap terminal.

Optionally, in some implementations, if the initial uplink BWP and the initial downlink BWP are configured for the RedCap terminal separately, appropriate bandwidth of the initial uplink BWP and appropriate bandwidth of the initial downlink BWP can be configured according to the bandwidth capability of the RedCap terminal. Therefore, the network device can determine the frequency domain resource for transmission of uplink information in the random access procedure according to the initial uplink BWP separately configured for the RedCap terminal, alternatively, the network device can determine the frequency domain resource for transmission of downlink information in the random access procedure according to the initial downlink BWP separately configured for the RedCap terminal.

Therefore, in implementations of the disclosure, the network device can determine, according to the bandwidth capability supported by the terminal device and the bandwidth information carried in the system information, the frequency domain resource for transmission of the first information in the random access procedure, so as to ensure that the frequency domain resource for transmission of the first information in the random access procedure is within the bandwidth capability range supported by the terminal device, so that the network device can correctly send or receive the first information in the random access procedure, and complete the random access procedure.

The method implementations of the disclosure are described in detail in the foregoing with reference to FIG. 4 to FIG. 11, and the device implementations of the disclosure are described in detail in the following with reference to FIG. 12 to FIG. 16. It should be understood that the device implementations correspond to the method implementations, and reference may be made to the implementations of the terminal side for similar description.

Figure 12:
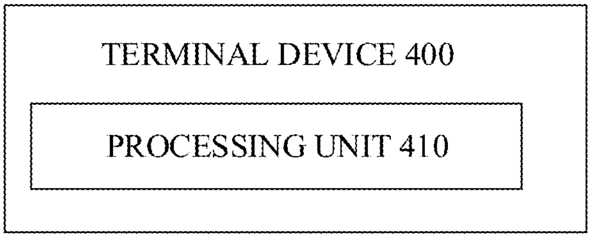
FIG. 12 is a schematic block diagram of a terminal device provided in implementations of the disclosure.

FIG. 12 is a schematic block diagram of a terminal device 400 according to implementations of the disclosure. As illustrated in FIG. 12, the terminal device 400 includes a processing unit 410.

The processing unit 410 is configured to determine, according to a bandwidth capability supported by the terminal device and bandwidth information obtained from system information, a frequency domain resource for transmission of first information in a random access procedure.

Optionally, the bandwidth information includes at least one of: a control resource set 0 (CORESET #0), an initial downlink bandwidth part (BWP), an initial uplink BWP.

Optionally, the bandwidth information includes the CORESET #0 and/or the initial downlink BWP, and the first information is downlink information in the random access procedure.

Optionally, the processing unit 410 is configured to: when a bandwidth of the CORESET #0 is greater than the bandwidth capability supported by the terminal device, determine that a frequency domain range for transmission of the first information is a first bandwidth in a bandwidth of the CORESET #0, where the first bandwidth is less than or equal to the bandwidth capability supported by the terminal device; or when a bandwidth of the initial downlink BWP is greater than the bandwidth capability supported by the terminal device, determine that the frequency domain range for transmission of the first information is a second bandwidth in the bandwidth of the initial downlink BWP, where the second bandwidth is less than or equal to the bandwidth capability supported by the terminal device.

Optionally, the first bandwidth is a center bandwidth of the CORESET #0, or the first bandwidth is an edge bandwidth of the CORESET #0.

Optionally, the second bandwidth is a center bandwidth of the initial downlink BWP, or the second bandwidth is an edge bandwidth of the initial downlink BWP.

Optionally, the first bandwidth is predefined in a protocol or preconfigured, or, the first bandwidth is configured or indicated by a network device, or, the first bandwidth is obtained from the system information.

Optionally, the second bandwidth is predefined in a protocol or preconfigured, or, the second bandwidth is configured or indicated by a network device, or, the second bandwidth is obtained from the system information.

Optionally, the processing unit 410 is configured to: when a bandwidth of the CORESET #0 is less than or equal to the bandwidth capability supported by the terminal device, determine that the frequency domain range for transmission of the first information is the bandwidth of the CORESET #0; or when a bandwidth of the initial downlink BWP is less than or equal to the bandwidth capability supported by the terminal device, determine that the frequency domain range for transmission of the first information is the bandwidth of the initial downlink BWP.

Optionally, the first information includes at least one of: the second message in a four-step random access procedure, the fourth message in the four-step random access procedure, or the second message in a two-step random access procedure.

Optionally, the bandwidth information includes the initial uplink BWP, and the first information is uplink information in the random access procedure.

Optionally, the processing unit 410 is configured to: when a bandwidth of the initial uplink BWP is greater than the bandwidth capability supported by the terminal device, determine that a frequency domain range for transmission of the first information is a third bandwidth in the bandwidth of the initial uplink BWP, where the third bandwidth is less than or equal to the bandwidth capability supported by the terminal device.

Optionally, the processing unit 410 is configured to: when a bandwidth of the initial uplink BWP is greater than the bandwidth capability supported by the terminal device, determine a frequency domain range for transmission of the first information according to an activated uplink BWP and a third bandwidth in the bandwidth of the initial uplink BWP, where the third bandwidth is less than or equal to the bandwidth capability supported by the terminal device.

Optionally, the processing unit 410 is configured to: when the activated uplink BWP and the third bandwidth have a same subcarrier spacing configuration and a same cyclic prefix (CP) length and the activated uplink BWP includes all resource blocks (RBs) in the third bandwidth, or when a bandwidth of the activated uplink BWP is the same as the third bandwidth, determine that the frequency domain range for transmission of the first information is the third bandwidth; or when the activated uplink BWP and the third bandwidth have different subcarrier spacing configurations and different CP lengths, determine that the frequency domain range for transmission of the first information is W RBs that start from the 1st RB in the activated uplink BWP, where W is a positive integer and W is equal to the number of RBs in the third bandwidth.

Optionally, the third bandwidth is a center bandwidth of the initial uplink BWP, or the third bandwidth is an edge bandwidth of the initial uplink BWP.

Optionally, the third bandwidth is predefined in a protocol or preconfigured, or, the third bandwidth is configured or indicated by a network device, or, the third bandwidth is obtained from the system information.

Optionally, the first information includes the third message in a four-step random access procedure.

Optionally, the terminal device is a terminal with reduced capability.

Optionally, the processing unit may be one or more processors.

It should be understood that, the terminal device 400 according to implementations of the disclosure may correspond to the terminal device in the method implementation of the disclosure, and the foregoing and other operations and/or functions of each unit in the terminal device 400 are separately intended to implement a corresponding process of the terminal device in the method 200 illustrated in FIG. 4. For brevity, details are not described herein again.

Figure 13:
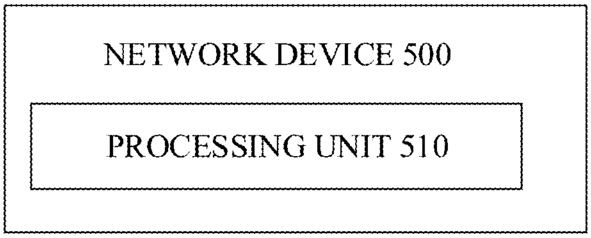
FIG. 13 is a schematic block diagram of a network device provided in implementations of the disclosure.

FIG. 13 is a schematic block diagram of a terminal device 500 according to implementations of the disclosure. As illustrated in FIG. 13, the terminal device 500 includes a processing unit 510.

The processing unit 510 is configured to determine, according to a bandwidth capability supported by a terminal device and bandwidth information carried in system information, a frequency domain resource for transmission of first information in a random access procedure.

Optionally, the bandwidth information includes at least one of: a control resource set 0 (CORESET #0), an initial downlink bandwidth part (BWP), an initial uplink BWP.

Optionally, the bandwidth information includes the CORESET #0 and/or the initial downlink BWP, and the first information is downlink information in the random access procedure.

Optionally, the processing unit 510 is configured to: when a bandwidth of the CORESET #0 is greater than the bandwidth capability supported by the terminal device, determine that a frequency domain range for transmission of the first information is a first bandwidth in a bandwidth of the CORESET #0, where the first bandwidth is less than or equal to the bandwidth capability supported by the terminal device; or when a bandwidth of the initial downlink BWP is greater than the bandwidth capability supported by the terminal device, determine that the frequency domain range for transmission of the first information is a second bandwidth in the bandwidth of the initial downlink BWP, where the second bandwidth is less than or equal to the bandwidth capability supported by the terminal device.

Optionally, the first bandwidth is a center bandwidth of the CORESET #0, or the first bandwidth is an edge bandwidth of the CORESET #0.

Optionally, the second bandwidth is a center bandwidth of the initial downlink BWP, or the second bandwidth is an edge bandwidth of the initial downlink BWP.

Optionally, the first bandwidth is predefined in a protocol or preconfigured, or, the first bandwidth is configured or indicated by the network device, or, the first bandwidth is carried in the system information.

Optionally, the second bandwidth is predefined in a protocol or preconfigured, or, the second bandwidth is configured or indicated by the network device, or, the second bandwidth is carried in the system information.

Optionally, the processing unit 510 is configured to: when a bandwidth of the CORESET #0 is less than or equal to the bandwidth capability supported by the terminal device, determine that the frequency domain range for transmission of the first information is the bandwidth of the CORESET #0; or when a bandwidth of the initial downlink BWP is less than or equal to the bandwidth capability supported by the terminal device, determine that the frequency domain range for transmission of the first information is the bandwidth of the initial downlink BWP.

Optionally, the first information includes at least one of: the $2^{nd}$ message in a four-step random access procedure, the $4^{th}$ message in the four-step random access procedure, or the $2^{nd}$ message in a two-step random access procedure.

Optionally, the bandwidth information includes the initial uplink BWP, and the first information is uplink information in the random access procedure.

Optionally, the processing unit 510 is configured to: when a bandwidth of the initial uplink BWP is greater than the bandwidth capability supported by the terminal device, determine that a frequency domain range for transmission of the first information is a third bandwidth in the bandwidth of the initial uplink BWP, where the third bandwidth is less than or equal to the bandwidth capability supported by the terminal device.

Optionally, the processing unit 510 is configured to: when a bandwidth of the initial uplink BWP is greater than the bandwidth capability supported by the terminal device, determine a frequency domain range for transmission of the first information according to an activated uplink BWP and a third bandwidth in the bandwidth of the initial uplink BWP, where the third bandwidth is less than or equal to the bandwidth capability supported by the terminal device.

Optionally, the processing unit 510 is configured to: when the activated uplink BWP and the third bandwidth have a same subcarrier spacing configuration and a same cyclic prefix (CP) length and the activated uplink BWP includes all resource blocks (RBs) in the third bandwidth, or when a bandwidth of the activated uplink BWP is the same as the third bandwidth, determine that the frequency domain range for transmission of the first information is the third bandwidth; or when the activated uplink BWP and the third bandwidth have different subcarrier spacing configurations and different CP lengths, determine that the frequency domain range for transmission of the first information is W RBs that start from the $1^{st}$ RB in the activated uplink BWP, where W is a positive integer and W is equal to the number of RBs in the third bandwidth.

Optionally, the third bandwidth is a center bandwidth of the initial uplink BWP, or the third bandwidth is an edge bandwidth of the initial uplink BWP.

Optionally, the third bandwidth is predefined in a protocol or preconfigured, or, the third bandwidth is configured or indicated by a network device, or, the third bandwidth is carried in the system information.

Optionally, the first information includes the third message in a four-step random access procedure.

Optionally, the terminal device is a terminal with reduced capability.

Optionally, the processing unit may be one or more processors.

It should be understood that, the network device 500 according to implementations of the disclosure may correspond to the network device in the method implementation of the disclosure, and the foregoing and other operations and/or functions of each unit in the network device 500 are separately intended to implement a corresponding process of the network device in the method 300 illustrated in FIG. 11. For brevity, details are not described herein again.

Figure 14:
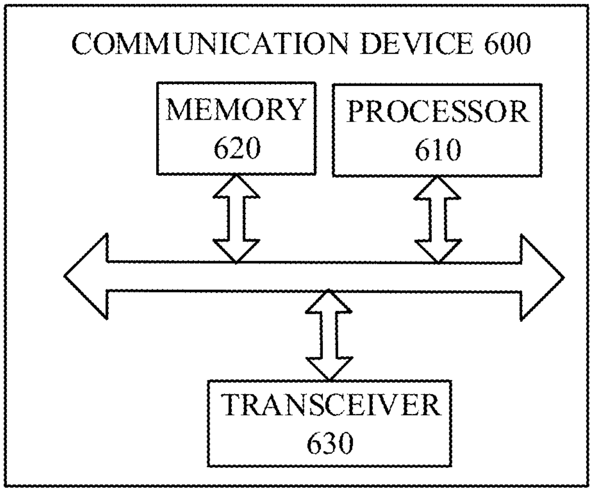
FIG. 14 is a schematic block diagram of a communication device provided in implementations of the disclosure.

FIG. 14 is a schematic structural diagram of a communication device 600 according to implementations of the disclosure. The communication device 600 illustrated in FIG. 14 includes a processor 610. The processor 610 may invoke and run a computer program from a memory, so as to implement the method in implementations of the disclosure.

Optionally, as shown in FIG. 14, the communication device 600 can further include a memory 620, where the processor 610 may invoke and run a computer program from the memory 620 to implement the method in implementations of the disclosure.

The memory 620 may be a separate component independent of the processor 610, and may also be integrated in the processor 610.

Optionally, as illustrated in FIG. 14, the communication device 600 can further include a transceiver 630. The processor 610 can control the transceiver 630 to communicate with other devices, and specifically, can send information or data to other devices, or receive information or data sent by other devices.

The transceiver 630 may include a transmitter and a receiver. The transceiver 630 can further include one or more antennas.

Optionally, the communication device 600 may specifically be the network device in implementations of the disclosure, and the communication device 600 may implement corresponding processes implemented by the network device in each method in implementations of the disclosure, which are not described herein again for brevity.

Alternatively, the communication device 600 may specifically be a terminal device in implementations of the disclosure, and the communication device 600 may implement corresponding processes implemented by the terminal device in each method in implementations of the disclosure, which are not described herein again for brevity.

Figure 15:
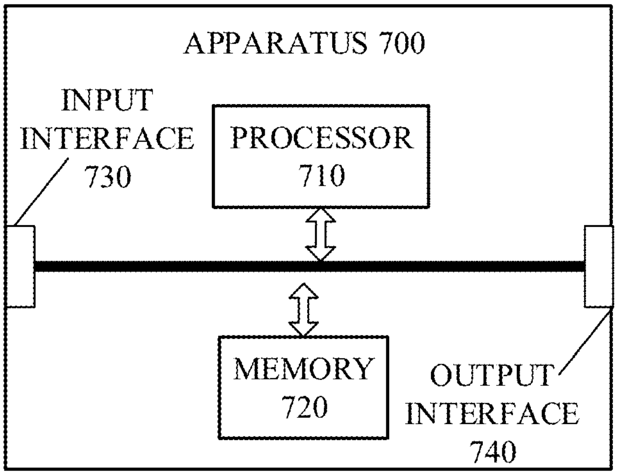
FIG. 15 is a schematic block diagram of an apparatus provided in implementations of the disclosure.

FIG. 15 is a schematic structural diagram of an apparatus provided in implementations of the disclosure. The apparatus 700 illustrated in FIG. 15 includes a processor 710. The processor 710 can invoke and run computer programs stored in a memory, to perform the method in implementations of the disclosure.

Optionally, as illustrated in FIG. 15, the apparatus 700 may further include a memory 720. The processor 710 can invoke and run the computer programs stored in the memory 720, to perform the method in implementations of the disclosure.

The memory 720 may be a separate device independent of the processor 710, or may be integrated into the processor 710.

Optionally, the apparatus 700 can further include an input interface 730. The processor 710 can control the input interface 730 to communicate with other devices or chips, specifically, to obtain information or data transmitted by other devices or chips.

Optionally, the apparatus 700 can further include an output interface 740. The processor 710 can control the output interface 740 to communicate with other devices or chips, specifically, to output information or data to other devices or chips.

Optionally, the apparatus can be applied to the network device in implementations of the disclosure, and the apparatus can implement the operations performed by the network device in various methods in implementations of the disclosure, which will not be repeated herein for the sake of simplicity.

Optionally, the apparatus can be applied to the terminal device in implementations of the disclosure, and the apparatus can implement the operations performed by the terminal device in various methods in implementations of the disclosure, which will not be repeated herein for the sake of simplicity.

Optionally, the apparatus provided in implementations of the disclosure can be a chip. For example, the chip can be a system level chip, a system chip, a chip system, or a system on chip (SoC).

Figure 16:
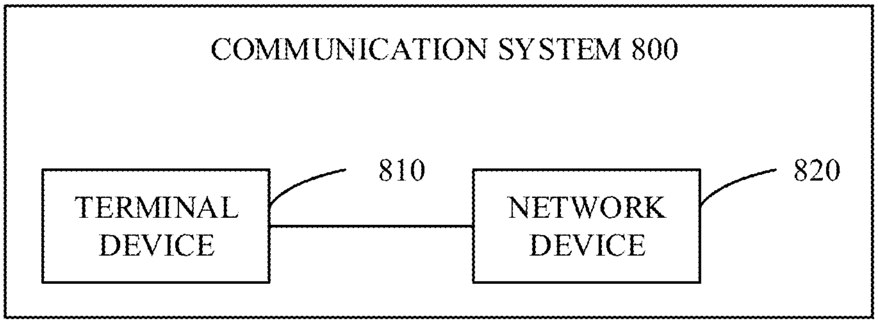
FIG. 16 is a schematic block diagram of a communication system provided in implementations of the disclosure.

FIG. 16 is a schematic block diagram of a communication system 800 provided in implementations of the disclosure. As illustrated in FIG. 16, the communication system 800 includes a terminal device 810 and a network device 820.

The terminal device 810 can implement functions of the terminal device in the foregoing methods, and the network device 820 can implement functions of the network device in the foregoing methods, which will not be repeated herein for the sake of simplicity.

It should be understood that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in implementations of the disclosure may also be an SRAM, a DRAM, an SDRAM, a DDR SDRAM, an ESDRAM, an SLDRAM, a DR RAM, etc. In other words, the memory in implementations of the disclosure is intended to include, but is not limited to, these and any other suitable types of memory.

Implementations of the disclosure further provide a computer-readable storage medium. The computer-readable storage medium is configured to store computer programs.

Optionally, the computer-readable storage medium is applicable to the network device of implementations of the disclosure. The computer programs are operable with a computer to implement the operations performed by the network device in various methods in implementations of the disclosure, which will not be repeated herein for the sake of simplicity.

Optionally, the computer-readable storage medium is applicable to the terminal device of implementations of the disclosure. The computer programs are operable with a computer to implement the operations performed by the terminal device in various methods in implementations of the disclosure, which will not be repeated herein for the sake of simplicity.

Implementations of the disclosure further provide a computer program product. The computer program product includes computer program instructions.

Optionally, the computer program product is applicable to the network device of implementations of the disclosure. The computer program instructions are operable with a computer to implement the operations performed by the network device in various methods in implementations of the disclosure, which will not be repeated herein for the sake of simplicity.

Optionally, the computer program product is applicable to the terminal device of implementations of the disclosure. The computer program instructions are operable with a computer to implement the operations performed by the terminal device in various methods in implementations of the disclosure, which will not be repeated herein for the sake of simplicity.

Implementations of the disclosure further provide a computer program.

Optionally, the computer program is applicable to the network device of implementations of the disclosure. The computer program, when executed by a computer, is operable with the computer to implement the operations performed by the network device in various methods in implementations of the disclosure, which will not be repeated herein for the sake of simplicity.

Optionally, the computer program is applicable to the terminal device of implementations of the disclosure. The computer program, when executed by a computer, is operable with the computer to implement the operations performed by the terminal device in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes in the foregoing method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A resource determination method, comprising:

determining, by a terminal device, according to a bandwidth capability supported by the terminal device and bandwidth information obtained from system information block 1 (SIB1), a frequency domain resource for transmission of first information in a random access procedure;

wherein the bandwidth information comprises CORESET #0, and comprises an initial uplink bandwidth part (BWP) and/or initial downlink BWP, and the first information comprises uplink and/or downlink information in the random access procedure;

wherein the terminal device is a terminal with reduced capability (RedCap terminal).

2. The method of claim 1, wherein determining, by the terminal device, according to the bandwidth capability supported by the terminal device and the bandwidth information obtained from the SIB1, the frequency domain resource for transmission of the first information in the random access procedure comprises:

when a bandwidth of the initial uplink BWP is greater than the bandwidth capability supported by the terminal device, determining, by the terminal device, a frequency domain range for transmission of the first information as a third bandwidth in the bandwidth of the initial uplink BWP, wherein the third bandwidth is less than or equal to the bandwidth capability supported by the terminal device.

3. The method of claim 2, wherein the first information comprises a third message in a four-step random access procedure.

4. The method of claim 2, wherein the third bandwidth is a center bandwidth of the initial uplink BWP, or the third bandwidth is an edge bandwidth of the initial uplink BWP.

5. The method of claim 2, wherein the third bandwidth is predefined in a protocol or preconfigured, or, the third bandwidth is configured or indicated by a network device, or, the third bandwidth is obtained from the SIB1.

6. The method of claim 2, wherein the first information comprises message 3 (Msg 3) in a four step random access procedure.

7. The method of claim 1, wherein determining, by the terminal device, according to the bandwidth capability supported by the terminal device and the bandwidth information obtained from the SIB1, the frequency domain resource for transmission of the first information in the random access procedure comprises:

when a bandwidth of the initial uplink BWP is greater than the bandwidth capability supported by the terminal device, determining, by the terminal device, a frequency domain range for transmission of the first information according to an activated uplink BWP and a third bandwidth in the bandwidth of the initial uplink BWP and, wherein the third bandwidth is less than or equal to the bandwidth capability supported by the terminal device.

8. The method of claim 7, wherein determining, by the terminal device, the frequency domain range for transmission of the first information according to the activated uplink BWP and the third bandwidth in the bandwidth of the initial uplink BWP comprises:

when the activated uplink BWP and the third bandwidth have a same subcarrier spacing configuration and a same cyclic prefix (CP) length and the activated uplink BWP comprises all resource blocks (RBs) in the third bandwidth, or when a bandwidth of the activated uplink BWP is the same as the third bandwidth, determining, by the terminal device, the frequency domain range for transmission of the first information as the third bandwidth; or when the activated uplink BWP and the third bandwidth have different subcarrier spacing configurations and different CP lengths, determining, by the terminal device, the frequency domain range for transmission of the first information as W RBs that start from a 1st RB in the activated uplink BWP, wherein W is a positive integer and W is equal to a number of RBs in the third bandwidth.

9. The method of claim 1, further comprising:

transmitting, by the terminal device, on a resource corresponding to message 1 (Msg 1), in a four step random access procedure, Msg 1 to a network device, wherein the resource corresponding to Msg 1 indicates a type of the terminal device, wherein the type of the terminal device is RedCap terminal, wherein the resource corresponding to Msg 1 comprises at least one of: an initial BWP where Msg1 is transmitted, a physical random access channel (PRACH) resource, or a PRACH preamble.

10. The method of claim 1, wherein:

in response to the RedCap terminal being separately configured with an initial uplink BWP and/or an initial downlink BWP, the RedCap terminal uses the separately configured initial uplink BWP and/or initial downlink BWP to transmit the first information; and in response to the RedCap terminal being not separately configured with an initial uplink BWP and/or an initial downlink BWP, the RedCap terminal shares an initial uplink BWP and/or initial downlink BWP of a non-RedCap terminal to transmit the first information.

11. A resource determination method, comprising:

determining, by a network device, according to a bandwidth capability supported by a terminal device and bandwidth information carried in system information block 1 (SIB1), a frequency domain resource for transmission of first information in a random access procedure;

wherein the bandwidth information comprises CORESET #0, and comprises an initial uplink bandwidth part (BWP) and/or initial downlink BWP, and the first information comprises uplink and/or downlink information in the random access procedure;

wherein the terminal device is a terminal with reduced capability (RedCap terminal).

12. The method of claim 11, further comprising at least one of:

determining the frequency domain resource for transmission of uplink information in the random access procedure according to the initial uplink BWP configured for the terminal device, wherein the initial uplink BWP is configured according to the bandwidth capability supported by the terminal device; and determining the frequency domain resource for transmission of downlink information in the random access procedure according to the initial downlink BWP configured for the terminal device, wherein the initial downlink BWP is configured according to the bandwidth capability supported by the terminal device;

wherein the initial uplink BWP configured is RedCap terminal specific, and the initial downlink BWP configured is RedCap terminal specific.

13. The method of claim 11, further comprising:

receiving, by the network device, message 1 (Msg 1) in a four step random access procedure, wherein a resource corresponding to Msg 1 indicates a type of the terminal device, wherein the type of the terminal device is a terminal with reduced capability RedCap terminal, wherein the resource corresponding to Msg 1 comprises at least one of: an initial BWP where Msg1 is transmitted, a physical random access channel (PRACH) resource, or a PRACH preamble.

14. The method of claim 11, wherein:

in response to the RedCap terminal being separately configured with an initial uplink BWP and/or an initial downlink BWP, the separately configured initial uplink BWP and/or initial downlink BWP is used by the RedCap terminal to transmit the first information; and in response to the RedCap terminal being not separately configured with an initial uplink BWP and/or an initial downlink BWP, an initial uplink BWP and/or initial downlink BWP of a non-RedCap terminal is shared by the RedCap terminal to transmit the first information.

15. A terminal device, comprising:

a processor; and a memory storing computer readable programs which, when executed by the processor, are operable with the processor to:

determine, according to a bandwidth capability supported by the terminal device and bandwidth information obtained from system information block (SIB1), a frequency domain resource for transmission of first information in a random access procedure;

wherein the bandwidth information comprises CORESET #0, and comprises an initial uplink bandwidth part (BWP) and/or initial downlink BWP, and the first information is comprises uplink and/or downlink information in the random access procedure;

wherein the terminal device is a terminal with reduced capability (RedCap terminal).

16. The terminal device of claim 15, wherein:

in response to the RedCap terminal being separately configured with an initial uplink BWP and/or an initial downlink BWP, the RedCap terminal uses the separately configured initial uplink BWP and/or initial downlink BWP to transmit the first information; and in response to the RedCap terminal being not separately configured with an initial uplink BWP and/or an initial downlink BWP, the RedCap terminal shares an initial uplink BWP and/or initial downlink BWP of a non-RedCap terminal to transmit the first information.

17. A network device, comprising:

a processor; and a memory storing computer readable programs which, when executed by the processor, are operable with the processor to:

determine, according to a bandwidth capability supported by a terminal device and bandwidth information carried in system information block 1 (SIB1), a frequency domain resource for transmission of first information in a random access procedure;

wherein the bandwidth information comprises CORESET #0, and comprises an initial uplink bandwidth part (BWP) and/or initial downlink BWP, and the first information comprises uplink and/or downlink information in the random access procedure;

wherein the terminal device is a terminal with reduced capability (RedCap terminal).

18. The network device of claim 17, wherein:

in response to the RedCap terminal being separately configured with an initial uplink BWP and/or an initial downlink BWP, the separately configured initial uplink BWP and/or initial downlink BWP is used by the RedCap terminal to transmit the first information; and in response to the RedCap terminal being not separately configured with an initial uplink BWP and/or an initial downlink BWP, an initial uplink BWP and/or initial downlink BWP of a non-RedCap terminal is shared by the RedCap terminal to transmit the first information.

* * * * *